(12) United States Patent
Murphy et al.

(10) Patent No.: US 6,803,856 B1
(45) Date of Patent: Oct. 12, 2004

(54) STORAGE APPARATUS

(75) Inventors: Rachel Lucy Murphy, Bristol (GB); David Mark Frohlich, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 237 days.

(21) Appl. No.: 09/656,594

(22) Filed: Sep. 7, 2000

(51) Int. Cl.[7] ............................................. G08B 13/14
(52) U.S. Cl. ........................ 340/572.1; 340/825.35; 340/825.49; 340/825.54; 340/570; 340/568.1; 340/568.2
(58) Field of Search ........................ 340/572.1, 825.35, 340/825.49, 825.54, 570, 568.1, 568.2

(56) References Cited

U.S. PATENT DOCUMENTS

| | | | | |
|---|---|---|---|---|
| 4,376,936 A | * | 3/1983 | Kott ........................ 340/825.3 |
| 5,038,023 A | * | 8/1991 | Saliga ........................ 340/568 |
| 5,357,495 A | * | 10/1994 | Solhjell ........................ 369/34 |
| 5,721,531 A | * | 2/1998 | Garver et al. ................ 340/568 |
| 5,751,221 A | * | 5/1998 | Stanfield et al. ........ 340/825.35 |
| 5,977,875 A | * | 11/1999 | Lin et al. .................... 340/570 |
| 6,259,367 B1 | * | 7/2001 | Klein ....................... 340/572.1 |

* cited by examiner

Primary Examiner—Jeffery Hofsass
Assistant Examiner—Hung Nguyen

(57) ABSTRACT

A storage apparatus for sentimental electronic memorabilia includes a memory and processor for the storage and manipulation of files within which memorabilia is stored, and a monitor for assimilating the memorabilia; in the case of visually assimilable files, the monitor is a visual monitor. Each file is associated with an artefact which acts as a vehicle for the establishment of sentimental links to electronically stored information. The artefacts are stored within a box which also houses the monitor and processor. The association of artefacts with files is through the provision of an rf tag identifier on the artefact. Once the identifier is read by an rf tag reader on the box, the file corresponding to the identifier is retrieved from the memory and furnished to a user in an assimilable form by means of the monitor.

18 Claims, 1 Drawing Sheet

STORAGE APPARATUS

BACKGROUND TO THE INVENTION

1. Field of the Invention

The present invention relates to a storage apparatus, which may be used, for example, to store sentimental memorabilia, such as files containing text, sound or pictures.

2. Description of Related Art

With the increasingly prevalent use of computers in modern life, electronic storage and transmission of messages, sound recordings and visual images are, to some extent, replacing the erstwhile conventional tangible storage and transmission media for such information, such as letters, tape recordings or photographs. However, while people have traditionally retained a degree of sentimental attachment for certain tangible objects, generally speaking the majority of people do not have a similar sentimental attachment to electronically stored information. A letter or photograph which is evocative of certain emotions is likely to become more precious to the owner over time as it becomes increasingly worn. Part of this attachment may reasonably be said to be created precisely by the relatively perishable nature of the artefact; its relatively ephemeral nature making it yet more precious. In any event, the tangible form of such keepsakes render them distinct in the minds of most people from similar information stored electronically.

SUMMARY OF THE INVENTION

One aspect of the present invention relates to a storage apparatus which effectively seeks to provide a tangible vehicle for enabling the establishment of emotional attachment to electronically stored information.

An aspect of the present invention provides a storage apparatus comprising: a container in which artefacts may be stored and which may be opened and closed thereby to enable artefacts to be placed inside or removed from the container, or to retain artefacts safely inside the container, a plurality of artefacts, each of which has a unique identification tag; an electronic memory containing a file corresponding to each of the artefacts in the container; an identification reader which identifies the tag of a particular artefact, and generates and identification signal accordingly; at least one monitor, a processor connected to the identification reader, the processor being adapted to receive an identification signal, to retrieve the file corresponding to the artefact identified by the identification signal, and to pass the file to the monitor in a manner which enables the information stored in the file to be assimilated by a user.

Typically the container will mimic a lockable jewellery box within which a plurality of artefacts are stored, and the monitor or monitors will be provided in the lid. In one embodiment of the present invention the tag on the artefact is an rf tag, of a type known per se, which actuates the identification reader (and thereafter the processor to cause the information to be appropriately rendered for the monitor) when the lid is opened and the artefact is removed from the box.

The monitor may be either a visual or aural monitor, and in one preferred embodiment of the present invention, both types of monitor are provided simultaneously. In one embodiment of the present invention the artefacts are identical, while in another the artefacts will be distinct, and typically visually distinct, although another sensory mechanism may be used to distinguish one artefact from another, such as sound, touch or smell for example.

BRIEF DESCRIPTION OF DRAWINGS

Embodiments of the invention will now be described, by way of example, and with reference to the accompanying drawings, in which.

DESCRIPTION OF PREFERRED EMBODIMENTS

Figure 1:
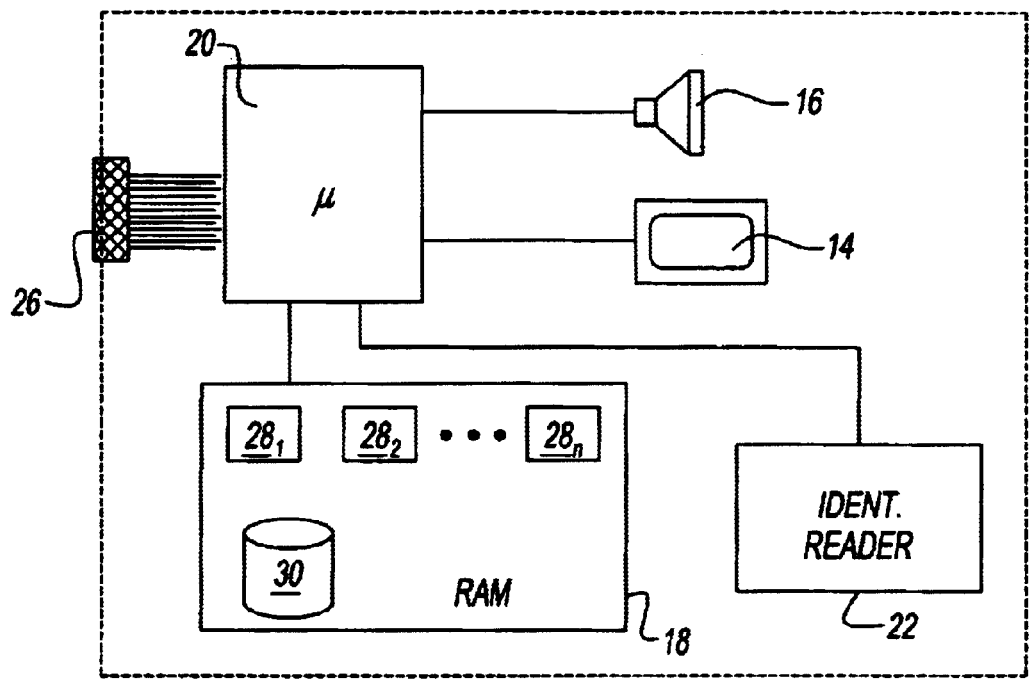
FIG. 1 is a schematic illustration of a storage apparatus according to the present invention.
Figure 2:
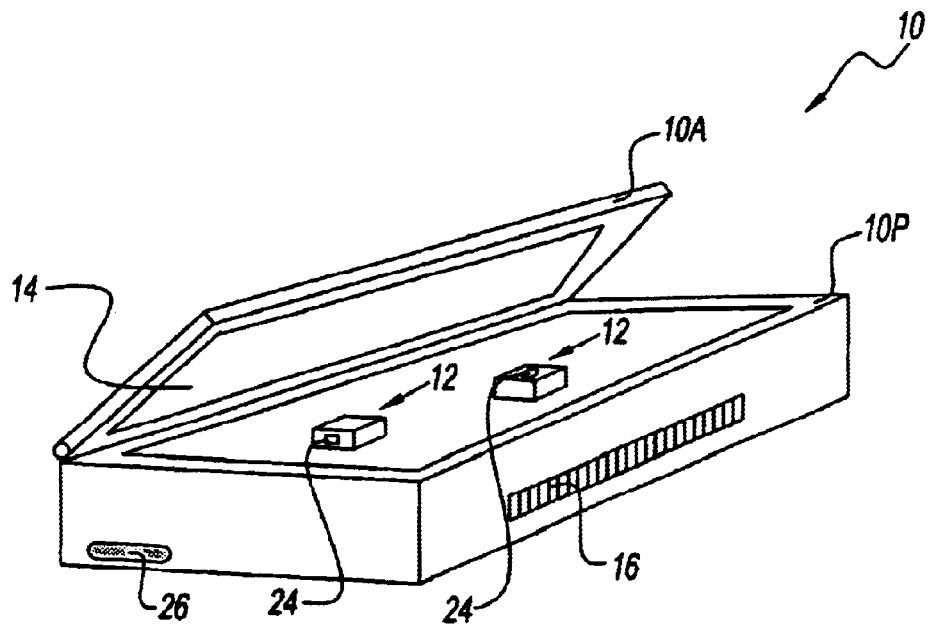
FIG. 2 is a perspective view of an embodiment of storage apparatus according to the present invention.

Referring now to FIGS. 1 and 2, a storage container, schematically denoted with the reference numeral 10, functions both as a container for a plurality of artefacts 12, and a physical support medium for a number of information storage and retrieval elements. In the present example the container has the form of a jewellery box in which the artefacts 12 are stored, and each artefact is uniquely identified by a tag. The tag on each artefact is in turn associated with a data file (typically an electronic data file) containing data from which, for example, a picture, a sound recording, or a moving image might be recreated and displayed or (in the case of a sound recording) played back to a user. Ideally by opening the lid 10A of the box and removing one of the artefacts the electronic storage and retrieval elements are actuated to retrieve the electronic file associated with the tag on the artefact in question, and to recreate the image or sound which is recorded by the data in the file. By creating such an association between the information which is stored electronically in the box and physical artefacts which are kept inside the box it is believed that the electronically stored information can attain sentimental value in the way that, for example, a photograph on which an image is stored might do.

The electronic information storage and retrieval elements physically supported by the box include a visual monitor, here provided by an LCD screen 14 of the type habitually found in laptop computers, and located in the lid 10A of the box; an aural monitor in the form of a loud speaker 16; a random access memory (RAM) 18; and a processor 20, connected to both the screen 14 and the RAM 18. The processor 20 is additionally connected to an if identification reader 22, this being a device which is responsive to the proximity of unique rf tags 24 to output a corresponding binary signal and is known per se. An input/output port 26 (which may for example be an RS232 serial port, a parallel port, or any other suitable form of port) enables the transmission of data files 28 containing, for example email messages, pictures, moving images, or recorded sounds into the RAM 18.

When a file is input to the RAM 18 via the port 26, the processor 20 will execute a programme 30 stored in the RAM 18 prompting the user to present an rf tag 24 to the identification reader 22 in order to create an association between the tag on the artefact in question and the stored file. This enables the processor 20 to retrieve the file corresponding to the rf tag on the artefact in question when the artefact is next removed from the box 10, and to transmit the file in an appropriate form to an appropriate monitor (eg visual or aural) which makes the information in the file manifest to a user. Preferably a plurality of identification readers 22 are located around the perimeter 10P of the box in order to ensure that removing an artefact 12 from the box inevitably causes retrieval of the corresponding file 28. In a preferred embodiment the screen 14 is a touch sensitive screen, and in conjunction with the programme 30 provides a user interface which displays prompts to a user and receives information from the user during the transmission of electronic data files into the RAM 18 from an external storage device.

In one embodiment of the present invention the artefacts 12 are identical. The file retrieved therefore upon extraction of an artefact 12 from the box 10 is not known in advance to a user. This configuration therefore amounts, to some extent, to the storage and random retrieval of electronic files having sentimental value to a user, in which sentimental value is attributed to electronically stored files, but not to the artefacts 12, which merely serve effectively as a vehicle for such sentimental attachment.

In an alterative embodiment, the artefacts are unique to at least one of the human senses, usually visual. Typically a box 10 will be made available commercially in conjunction with a plurality of artefacts which already have unique identification tags. A particular artefact is then associated with a particular data file simply at the whim of the user, who selects a given artefact for association with a given data file.

In a further preferred form of the present invention a box 10 is commercially available with a plurality of rf tags, these tags then being attachable to artefacts of the user's choice, to enable the use of artefacts which intrinsically have sentimental value to a user to be associated with electronic data files.

The embodiment of the invention described above includes a random access memory as the primary memory device. This may be supplemented as desired (for example in the event that the amount of data stored becomes large) by a conventional hard disc, and/or by a CD ROM memory system. In a further modification the storage box may incorporate a microphone (together with appropriately configured ancillary storage and processing capability) to enable a user to record an aural memo or some other form of sound to identify or otherwise annotate the file. Similarly the user interface may include the ability for the user to write text for the same or a similar purpose.

In a modification of the storage device of FIG. 2, the device additionally includes a network port to enable the integration of the storage box into a network as desired. A further possible modification with such a modified device would be to provide remote storage of files on a network server (e.g. a server which is part of the internet), and possibly also a degree of remote processing for file management purposes, for example. This embodiment has the advantage that, once access is gained to a file containing sentimental information relating to a particular person, the server is programmed to notify that person via the network that memorabilia related to them is being viewed; it is thought that this will create a sentimental moment between the two people even though they are apart. Optionally, both the viewer and the notified person can have access to the file, and be automatically connected to each other in order to enhance the moment.

What is claimed is:

1. A storage apparatus comprising:
   a container in which artefacts may be stored and which maybe opened and closed thereby to enable artefacts to be placed inside or removed from the container, or to retain artefacts safely inside the container;
   a plurality of artefacts, each of which has a unique identification tag;
   an electronic memory containing a file corresponding to each of the artefacts in the container;
   an identification reader which identifies the tag of a particular artefact when the artefact is brought into a predetermined relationship with the container, and generates an identification signal accordingly;
   at least one monitor; and
   a processor connected to the identification reader, the processor being adapted to receive an aforesaid identification signal and, in response to receipt of said identification signal, to retrieve the file corresponding to the artefact identified by the identification signal, and to pass the file to the monitor in a manner which enables the file to be made manifest to a user by the monitor.

2. The storage apparatus according to claim 1, wherein the identification reader is actuable to read the tag when an artefact is removed from the container.

3. The storage apparatus according to claim 1, wherein the processor and monitor are integral with the container.

4. The storage apparatus according to claim 3, wherein the container has a rigid casing, with an openable lid, and the monitor is incorporated in the lid.

5. The storage apparatus according to claim 1, further comprising a visual monitor.

6. The storage apparatus according to claim 1, further comprising an aural monitor.

7. The storage apparatus according to claim 5, wherein the files stored in the memory are selected from the group consisting of files of email messages, files of sound recordings, files of moving pictures, files of moving images and text files.

8. The storage apparatus according to claim 1, wherein the artefacts are distinct to at least one of the following human senses: sight, touch or smell.

9. The storage apparatus according to claim 1, further comprising an input interface for the processor, via which files may be transmitted to the memory from an external storage device.

10. The storage apparatus according to claim 9, further comprising a writer for writing identification tags, the writer being connectable to the processor to enable recognition of a newly written tag by the rf identifier.

11. The storage apparatus according to claim 1, wherein the memory is provided in a network, and is remotely located from the container, and wherein a network connection enables communication between the memory and the container.

12. A container comprising:
   an area for holding an artefact having an identification tag, wherein said container may be opened or closed to allow the artefact to be placed in or removed from the area;
   a store for storing an electronic file associated with the artefact;
   a reader for reading the identification tag and producing a signal accordingly when the artefact is brought into a predetermined relationship with the container; and
   a processor connected to the reader and adapted to, upon receipt of the signal, retrieve the electronic file from the store and make the file manifest on a monitor.

13. The container of claim 12, wherein the electronic file is a type selected from the group consisting of: electronic mail, a sound recording, an image, and text.

14. The container of claim 12, wherein the monitor manifests visually assimilable files.

15. The container of claim 12, wherein the monitor manifests aurally assimilable files.

16. The container of claim 12, wherein the artefact is distinct to a sense selected from the group consisting: sight, touch and smell.

17. The container of claim 12, wherein the store is a digital memory.

18. The container of claim 12, wherein the identification tag is an RF tag, and the reader is an RF tag reader.

* * * * *